United States Patent
Lu et al.

(10) Patent No.: US 10,429,272 B2
(45) Date of Patent: Oct. 1, 2019

(54) COMMAND-DRIVEN AUTOMATIC AND SEMI-AUTOMATIC MOBILE WEAR DETECTION

(71) Applicant: Caterpillar Inc., Peoria, IL (US)

(72) Inventors: Stephen P. Lu, Peoria, IL (US); Ted J. Pauly, Washington, IL (US); Conor D. Aberle, Bloomington, IL (US); Mark S. Diekevers, Washington, IL (US); Michael D. Hasselbusch, Metamora, IL (US); Kevin N. O'Brien, Edwards, IL (US)

(73) Assignee: Caterpillar Inc., Peoria, IL (US)

( * ) Notice: Subject to any disclaimer, the term of this patent is extended or adjusted under 35 U.S.C. 154(b) by 210 days.

(21) Appl. No.: 15/276,822

(22) Filed: Sep. 27, 2016

(65) Prior Publication Data

US 2017/0091375 A1    Mar. 30, 2017

Related U.S. Application Data (60) Provisional application No. 62/235,015, filed on Sep. 30, 2015.

(51) Int. Cl.
    G06G 7/48       (2006.01)
    G01M 13/023     (2019.01)
    (Continued)

(52) U.S. Cl.
    CPC .......... *G01M 13/023* (2013.01); *G06Q 10/20* (2013.01); *G06T 7/001* (2013.01); *G05B 23/0283* (2013.01); *G06T 2207/30164* (2013.01)

(58) Field of Classification Search
    None
    See application file for complete search history.

(56) References Cited

U.S. PATENT DOCUMENTS

| | | |
|---|---|---|
| 4,942,539 A | 7/1990 | McGee et al. |
| 7,493,112 B2 | 2/2009 | Adachi et al. |

(Continued)

FOREIGN PATENT DOCUMENTS

| | | |
|---|---|---|
| CN | 102825505 | 12/2012 |
| CN | 103528571 | 1/2014 |

(Continued)

OTHER PUBLICATIONS

Tuke, Mike, et al. "3D linear and volumetric wear measurement on artificial hip joints—Validation of a new methodology." Precision Engineering 34.4 (2010): 777-783.*

(Continued)

*Primary Examiner* — Aniss Chad
*Assistant Examiner* — Nithya J. Moll
(74) *Attorney, Agent, or Firm* — Schwegman, Lundberg & Woessner (57) ABSTRACT

Systems and methods for command-driven automatic and semi-automatic mobile wear detection are disclosed. One method may include: transmitting, by a mobile device, a request indicative of a desire to determine a wear metric associated with a part; receiving, by the mobile device, first data associated with the part and indicative of a directive for the mobile device to display an instruction for the mobile device to be situated in a specified position; responsive to a determination, by the mobile device, that the mobile device is situated in the specified position, receiving, by a camera of the mobile device, visual data associated with the part; receiving, by the mobile device, second data indicative of a directive for the mobile device to process the visual data; determining, by the mobile device, the wear metric based, at least, on the processed visual data.

15 Claims, 6 Drawing Sheets

(51) Int. Cl.
  *G06Q 10/00*   (2012.01)
  *G06T 7/00*    (2017.01)
  *G05B 23/02*   (2006.01)

(56) References Cited

U.S. PATENT DOCUMENTS

| | | | |
|---|---|---|---|
| 8,169,604 B2 | 5/2012 | Braghiroli et al. | |
| 8,401,276 B1 | 3/2013 | Choe et al. | |
| 8,976,172 B2 | 3/2015 | Jones | |
| 9,169,623 B2* | 10/2015 | Rebinsky | E02F 9/267 |
| 9,868,482 B2* | 1/2018 | Rust | B62D 55/14 |
| 2008/0152213 A1* | 6/2008 | Medioni | G06K 9/00208 |
| | | | 382/154 |
| 2012/0306916 A1 | 12/2012 | Marumoto et al. | |
| 2013/0255354 A1 | 10/2013 | Hawkins et al. | |
| 2015/0066291 A1 | 3/2015 | Johannsen et al. | |
| 2015/0081166 A1 | 3/2015 | Diekevers et al. | |
| 2015/0149049 A1 | 5/2015 | Bewley et al. | |

FOREIGN PATENT DOCUMENTS

| | | |
|---|---|---|
| JP | 2008224484 | 9/2008 |
| JP | 2009229439 | 10/2009 |
| KR | 101534259 | 7/2015 |

OTHER PUBLICATIONS

Wall, C. M., et al. "Technique for high-sensitivity "In vitro" wear measurement of UHMWPE hip joint liners using radioactive tracer technology." Wear 259.7-12 (2005): 964-971.*

Ouilhet, Hector. "Google Sky Map: using your phone as an interface." Proceedings of the 12th international conference on Human computer interaction with mobile devices and services. ACM, 2010.*

* cited by examiner

COMMAND-DRIVEN AUTOMATIC AND SEMI-AUTOMATIC MOBILE WEAR DETECTION

RELATED APPLICATIONS

This application is based upon and claims priority from U.S. Provisional Application No. 62/235,015 by Stephen Lu et al., filed Sep. 30, 2015, the contents of which are expressly incorporated herein by reference.

TECHNICAL FIELD

This disclosure relates generally to machine part maintenance and more particularly to a system and method of command-driven automatic and semi-automatic mobile wear detection.

BACKGROUND

Equipment, such as a heavy machines, operating at a worksite may be subjected to heavy use and tough conditions. Accordingly, the various parts of the equipment may wear over time and eventually require replacement or repair. For example, the track links of a tracked excavator may be subject to forces as the excavator moves about the worksite, thereby causing the track links to wear over time. It may be useful for the on-site operator to know the precise amount of wear on a part so that the operator may estimate the remaining useful life of the part and plan for its repair or replacement before the part fails. Determining the degree of wear on the part, however, may be difficult without specific and detailed information pertaining to the part. For example, if the operator were to manually measure one or more dimensions of the part, the operator may be unaware of how the measured dimensions compare to the dimensions of the part before it was worn and/or what degree of wear is represented by the measured dimensions.

U.S. Pat. No. 9,121,697 to Marumoto et al. (the '697 patent) purports to provide one alleged solution to this problem. In the system described in the '697 patent, a wear amount is determined by overlapping an image of the real object and a plan image based on design plan data. This system, however, may lack portability and be ill suited to efficiently accommodate a variety of part types. These and other shortcomings are addressed in the present disclosure.

SUMMARY

This disclosure relates to a system and method for command-driven automatic and semi-automatic mobile wear detection. In an aspect, a method may include: transmitting, by a mobile device, a request indicative of a desire to determine a wear metric associated with a part; receiving, by the mobile device, first data associated with the part and indicative of a directive for the mobile device to display an instruction for the mobile device to be situated in a specified position; responsive to a determination, by the mobile device, that the mobile device is situated in the specified position, receiving, by a camera of the mobile device, visual data associated with the part; receiving, by the mobile device, second data indicative of a directive for the mobile device to process the visual data; determining, by the mobile device, the wear metric based, at least, on the processed visual data.

In another aspect, a method may include: receiving, by a mobile device, first data associated with the part and indicative of a directive for the mobile device to communicate an instruction for the mobile device to be situated in a specified position; receiving, by a mobile device, second data comprising one or more dimensions of a part in an unworn state; responsive to a determination, by the mobile device, that the mobile device is situated in the specified position, receiving, by a camera of the mobile device, visual data associated with the part; generating, by the mobile device, a digital model of the part based, at least, on the visual data; and determining, by the mobile device, a wear metric based, at least, on the digital model of the part and the second data.

In yet another aspect, a mobile device may include a processor; a camera; and a memory communicatively coupled with the processor, the memory having stored thereon executable instructions that when executed by the processor cause the processor to effectuate operations comprising: transmitting a request indicative of a desire to determine a wear metric associated with a part; receiving first data associated with the part and indicative of a directive for the mobile device to communicate an instruction for the mobile device to be situated in a specified position; responsive to a determination that the mobile device is situated in the specified position, receiving, by the camera, visual data associated with the part; receiving second data indicative of a directive for the mobile device to process the visual data; and processing, based at least on the second data, the visual data to determine the wear metric.

BRIEF DESCRIPTION OF THE DRAWINGS

The following detailed description is better understood when read in conjunction with the appended drawings. For the purposes of illustration, examples are shown in the drawings; however, the subject matter is not limited to the specific elements and instrumentalities disclosed. In the drawings.

DETAILED DESCRIPTION

Disclosed is a system and method for command-driven automatic and semi-automatic mobile wear detection. In an aspect, a mobile device and a camera of the mobile device may be used to determine the degree of wear of a part in a piece of equipment located at a worksite. The mobile device may receive one or more directives, customized for the particular part, from a central server that may be used by the mobile device to guide the operator in positioning the mobile device to capture images or video of the part to be measured. The mobile device may further receive one or more processing commands that may be used to analyze the captured images or video. The mobile device may create a model, such as a three-dimensional reconstruction, of the part which, in turn, may be evaluated to detect a degree of wear of the part.

Figure 1:
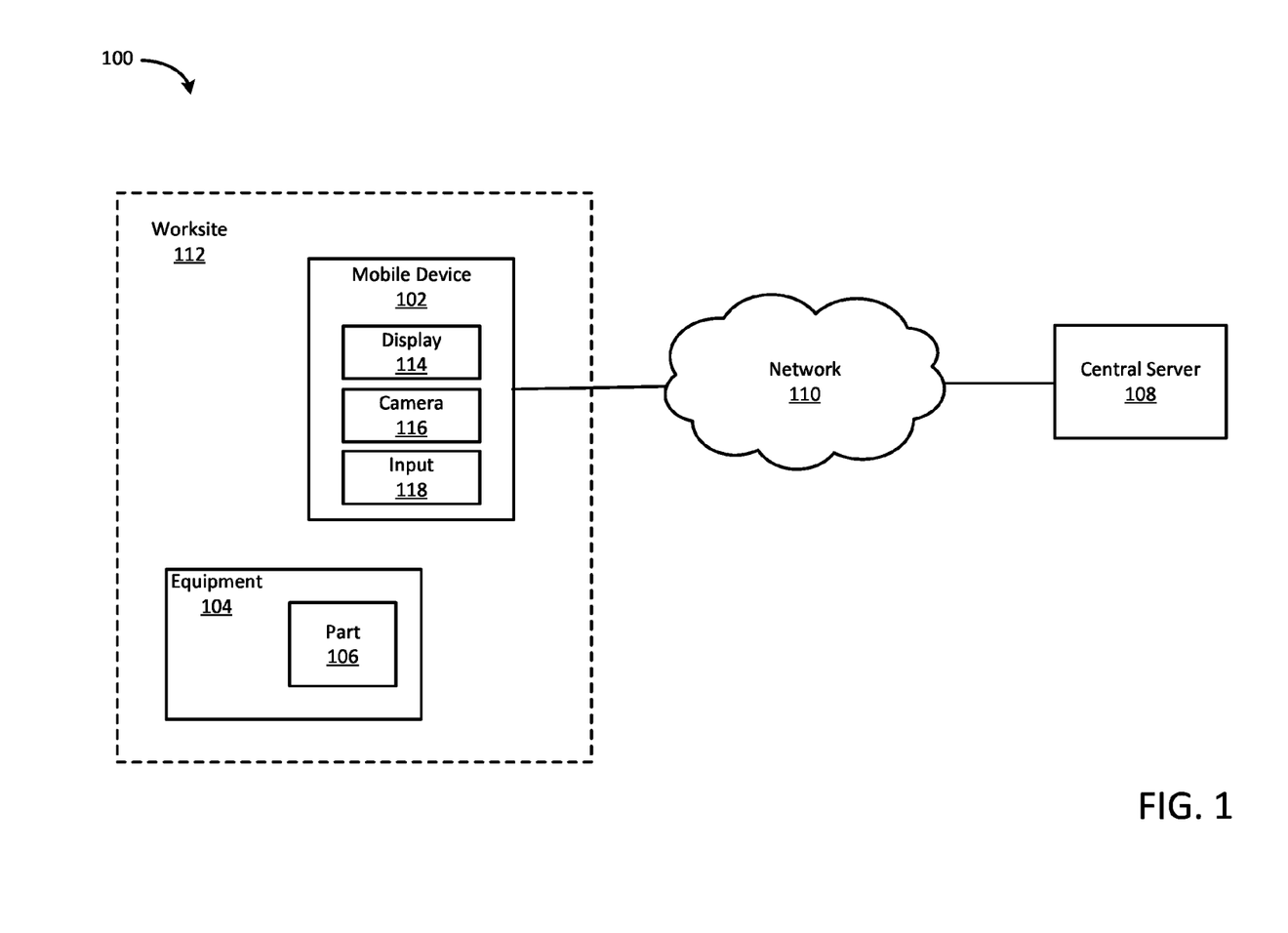
FIG. 1 illustrates an example environment in which the disclosed system and method may be implemented.

FIG. 1 illustrates an environment 100 in which the disclosed system and method of command-driven automatic and semi-automatic mobile wear detection may be implemented. The environment 100 may include a worksite 112 at which one or more articles of equipment 104 may be used. As examples, the worksite 112 may include a construction site, a mining site, a logging site, or an agricultural site. The equipment 104 may include, for example, any tool (e.g., a jackhammer), implement (e.g., a bucket implement), or heavy machine. Examples of heavy machines may include an excavator, a bulldozer, a hauling machine, or a back-end loader.

Figure 2:
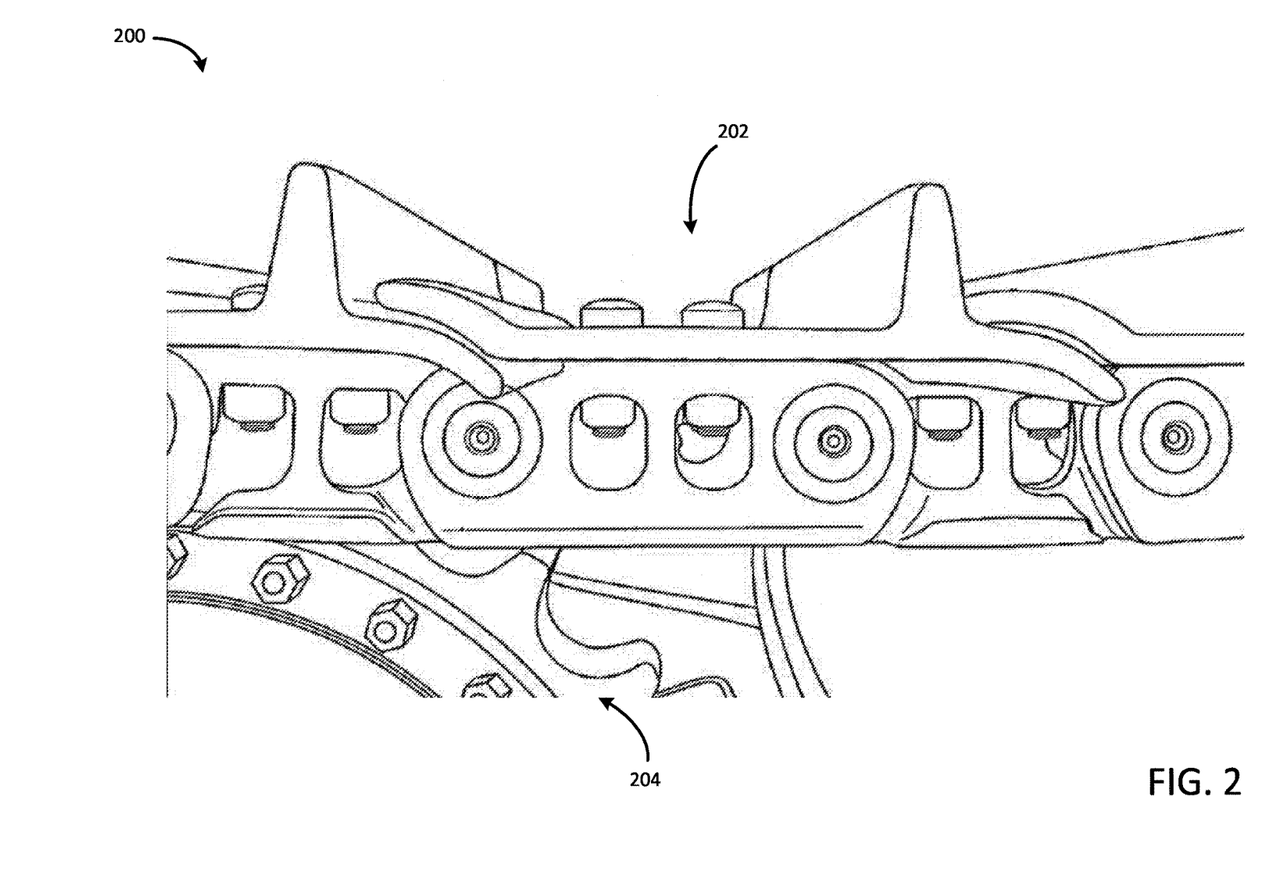
FIG. 2 illustrates a side view of a part in accordance with aspects of the disclosure.

The equipment 104 may include one or more parts 106. The part 106 may refer to any component or subcomponent of the equipment 104 and may be subject to wear. For example, a tracked heavy machine may include a track system made up of a series of interconnected track links and sprockets. FIG. 2 depicts a portion of such a track system 200 containing a track link 202 and a sprocket 204. As the tracked heavy machine moves about the worksite 112, the friction of the sprockets 204 and track links 202 against one another may cause wear to the track links 202 and/or the sprockets 204. As another example, a bulldozer may include a bucket configured with ground-engaging teeth. The ground-engaging teeth may suffer wear as the bulldozer uses the bucket to move earth or other materials.

Returning to FIG. 1, a mobile device 102 may be employed, such as by an onsite operator, to measure the wear of the part 106 according to the disclosed systems and methods. The mobile device 102 may be or include a portable computing device, such as a laptop computer, a cellular phone, a personal digital assistance (PDA), smartphone, or tablet computer. The mobile device 102 may be configured with a display 114, a means for user input 118 (e.g., a touch-sensitive display or a keypad), and a means for audio output (e.g., a speaker or audio jack). The mobile device 102 may further be equipped with a camera 116, a communication interface (e.g., a WiFi or cellular communication interface), a processor, a memory, and a global positioning system (GPS) or global navigation satellite system (GNSS) receiver. The mobile device 102 may be configured with an inertial measurement unit (IMU), which may include an accelerometer and/or a gyroscope.

The mobile device 102 may be communicatively connected, via a network 110, to a central server 108. The network 110 may include a wide area network (WAN), a local area network (LAN), the Internet, an intranet, a cellular network, a satellite network, or any other suitable network for transmitting data. The network 110 may be implemented as a wired network, a wireless network, or a combination thereof. The central server 108 may be implemented as a single server or a group of connected servers.

The central server 108 may include a repository in which part descriptions, feature detectors, measurement instructions, and processing commands may be stored. The part descriptions may include, for example, a description or representation of the part 106 in an unworn state. The feature detectors may include an analysis engine, and parameters thereof, for recognizing one or more features of the part 106. The measurement instructions may contain data that may be used by the mobile device 102 to assist the operator in making a wear detection. The processing commands may include data that may be used by the mobile device 102 to analyze and interpret captured data, such as images or video of the worn part 106, to determine a wear metric. The part descriptions, feature detectors, measurement instructions, and processing commands will be described in further detail below.

Separate sets of part descriptions, feature detectors, measurement instructions, and processing commands may be created and stored on the central server 108 for each part 106 that is contemplated to be measured. Additional sets of part descriptions, feature detectors, measurement instructions, and processing commands may also be created or stored according to the types of equipment 104 in addition to the types of parts 106. Upon request, such as from the mobile device 102 when the operator wishes to measure the wear on the part 106, the central server 108 may transmit, such as via the network 110, the part descriptions, feature detectors, measurement instructions, and processing commands associated with the part 106 to the mobile device 102.

Figure 3:
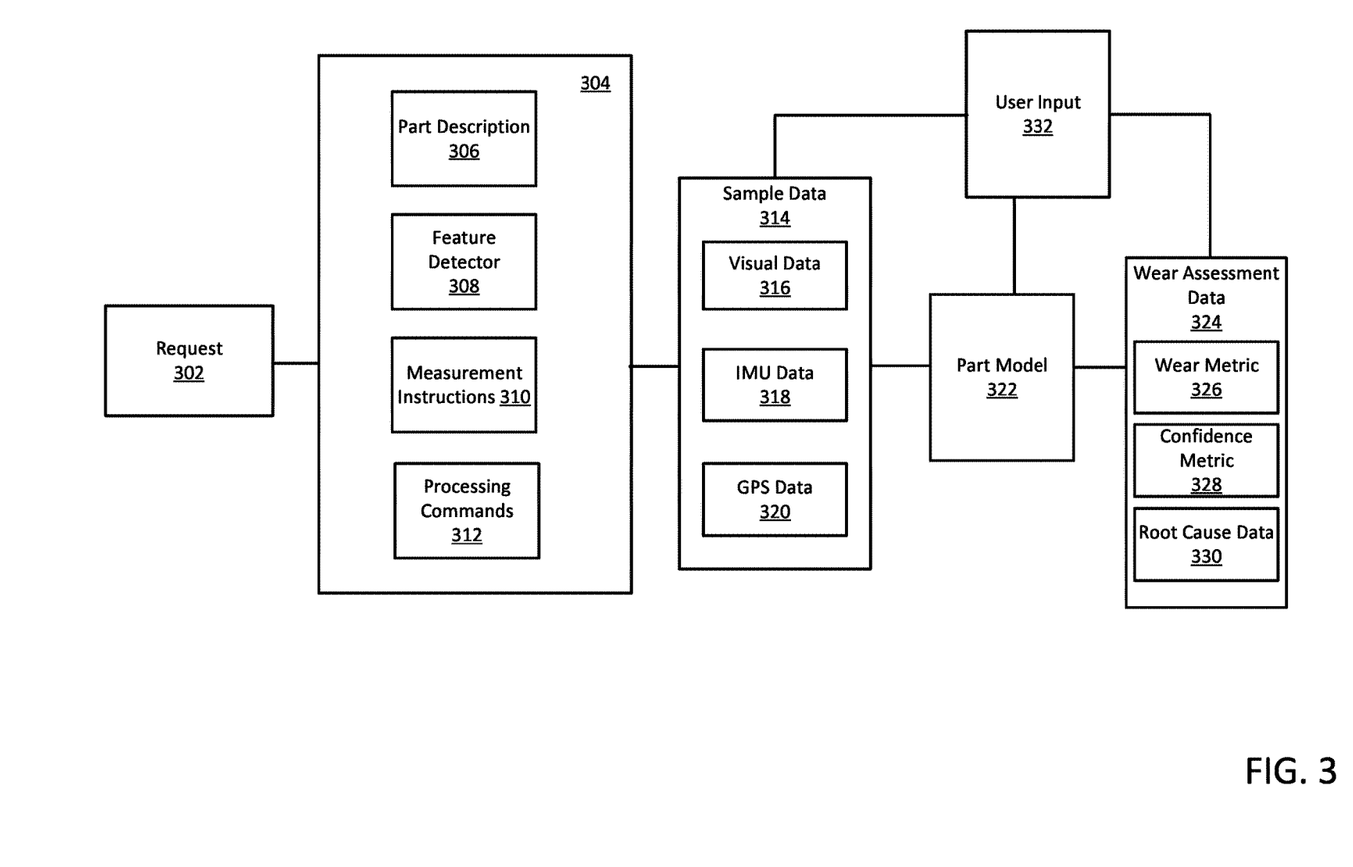
FIG. 3 illustrates an example data flow diagram in accordance with aspects of the disclosure.

FIG. 3 depicts an example flow diagram in which the mobile device 102 may be used to measure the wear on the part 106 and/or determine a wear metric for the part 106. A request 302 may be transmitted, such as from the mobile device 102 to the central server 108 via the network 110, to indicate that an operator at the worksite 112 wishes to determine the degree of wear on one of the parts 106 of the equipment 104 at the worksite 112. The request 302 may include an indication of the part 106, such as a model and/or serial number of the part 106, and an indication of the equipment 104, such as a model and/or serial number of the equipment 104. The central server 108 may receive the request 302 and receive or access stored measurement data 304 associated with the part 106 and/or the equipment 104. For example, the central server 108 may cross reference the model or serial number of the part 106 (or additionally the model or serial number of the equipment 104) to determine and receive and/or access the measurement data 304 associated with the part 106 or the combination of the part 106 and the equipment 104. The central server 108 may transmit, such as via the network 110, the measurement data 304 to the mobile device 102. In an aspect, the mobile device 102 may already have all or some of the measurement data 304.

The measurement data 304 may include a part description 306, a feature detector 308, measurement instructions 310, and processing commands 312.

The part description 306 may include an identifier of the part 106, such as the model and/or serial number of the part 106. The part description 306 may include indications of recognizable and geometric features of the part 106 and feature detection parameters. As used herein, the term feature may refer to any element of the part 106, such as a surface, edge, protrusion, knob, bolt, gear cog, etc., present on the part 106. The part description 306 may further include an indication of one or more elements, such as a surface, of the part 106 that is subject to wear. The part description 306 may include data indicative of the position of the part 106 relative to the equipment 104 in which it is a part of, such as two- or three-dimensional position information.

The part description 306 may additionally include data to interpret the wear of the part 106. The data to interpret the wear of the part 106 may include correlations (e.g., a chart or wear curve) of possible measured units (e.g., percentage or millimeters) of some aspect of the part 106 with a set of nominal values which may reflect a degree of wear. For instance, a first range of measured unit values may correlate with a value of "good," a second range of measured unit values may correlate with a value of "fair," and a third range of measured unit values may correlate with a value of "bad." The data to interpret wear may further include an indication of the type of audience that will perform and/or receive the determination of the degree of wear, such as whether the audience is a machine operator, a repair technician, or is associated with a dealer. The indication of the type of audience may be used to determine a form in which a determined wear metric is presented. For example, if the audience is a machine operator, with little technical knowledge of the particular part 106, the wear metric may be presented as a value such as "good," "fair," or "bad." On the other hand, if the audience is a repair technician experienced in servicing the part 106, the wear metric may be presented as raw data, such as the number of millimeters that a surface has been worn down, and/or the percentage of wear according to the wear chart or curve. The repair technician may further be presented with a confidence metric (discussed further herein) associated with the wear metric.

The feature detector 308 may include data reflecting the two- or three-dimensional profile of one or more features of the part 106, including the relative geometric position of the feature within the part 106 and/or the equipment 104. The feature detector 308 may include a feature detection analysis engine, such a convolutional neural network, that may be used detect one or more features in a representation of the part 106.

The measurement instructions 310 may contain one or more written directives, auditory signal directives, screen overlay directives, and/or sample processing directives. The written directives may be used by the mobile device 102 to generate textual instructions, such as on the display 114 of the mobile device 102, to guide the operator in positioning the mobile device 102 and the camera 116 on the mobile device 102 so that sufficient graphical data may be gathered by the mobile device 102 to make a determination as to the degree of wear of the part 106. For example, the written directives may cause the mobile device 102 to display textual instructions on the display 114 informing the operator where on the equipment 104 the part 106 is located. If the operator is holding the mobile device 102 in a position too far to the right of the part 106, the written directives may cause the mobile device 102 to display a textual instruction directing the operator to move the mobile device 102 to the left.

The auditory signal directives may be used by the mobile device 102 to generate, such as via the speaker and/or audio jack of the mobile device 102, auditory feedback to the operator to assist the operator in correctly positioning the mobile device 102. For example, the auditory feedback may include a tone or series of discrete tones in which the frequency of the tone or series of discrete tones may be varied according to whether the operator is holding the mobile device 102 in a correct position. For instance, the mobile device 102 may emit a series of beeps in which the frequency of the beeps increases as the operator moves the mobile device 102 closer to the correct positioning, culminating in the series of beeps becoming a constant beep when the mobile device 102 is correctly positioned. As another example, the auditory feedback may comprise a verbal instruction directing the operator to position the mobile device 102 in a specified manner (e.g., to move the mobile device 102 a certain distance in a certain direction or to rotate and/or tilt the mobile device 102 a certain number of degrees).

The screen overlay directives may be used by the mobile device 102 to cause one or more visual overlays to be displayed, such as on the display 114 of mobile device 102, concurrently with a view from the camera 116 of the mobile device 102. The visual overlay may assist the operator in positioning the mobile device 102 so that it may gather sufficient graphical data pertaining to the part 106 to make a determination of a wear metric. Accordingly, the visual overlay may include any visual indicators that may assist the operator in positioning the mobile device 102, such as a line, an arrow, or an outline of the shape of the part 106. As an example, the visual overlay may include a pair of lines to which the operator is supposed to align, respectively, the top and bottom edges of the part 106 in the view of the part 106 on the display 114 of the mobile device 102. As another example, the visual overlay may include an outline of the part 106 or feature thereof to which the operator is to align the part 106 or feature in the view of the part 106 on the display 114 of the mobile device 102.

The sample processing directives may be used by the mobile device 102 to ensure that the mobile device 102 has captured a sufficient quality and/or quantity of data to make a determination of a degree of wear of the part 106. For example, the sample processing directives may specify one or more minimum features of the part 106 which is to be detected before the degree of wear is to be determined. As another example, the sample processing directives may specify one or more detected movements and/or rotations of the mobile device 102 that are expected to occur, such as following a textual instruction, auditory feedback, or visual overlay. For example, if a textual instruction provides an instruction for the operator to move ten centimeters to the left, the sample processing directive may prescribe that the mobile device 102 detect that the mobile device 102 is moved accordingly. If mobile device 102 determines that the mobile device 102 is moved according to a textual instruction, auditory feedback, or visual overlay or that an expected feature is detected, the mobile device 102 may provide an additional a textual instruction, auditory feedback, or visual overlay to advance the process of the mobile device capturing data.

The processing commands 312 may include one or more commands usable by the mobile device 102 to access, analyze, subsample, transform, and/or measure sample data pertaining to the part 106 and captured by the mobile device 102. For example, the processing commands 312 may include one or more commands to evaluate quantifiable properties of the captured visual data and/or resultant reconstruction of the part 106. The processing commands 312 may further be used by the mobile device 102 to determine a confidence metric indicating the degree to which the quantifiable properties of the captured visual data will yield a measurement usable to determine, either in an automatic or semi-automatic manner, a wear metric.

The processing commands 312 may further include commands usable by the mobile device 102 to condition and/or filter the captured visual data and/or the two- or three-dimensional reconstruction of the part 106. For instance, the filtering or conditioning commands for visual data may include localized-gamma correction, rotation, segmentation, and/or edge detection. The filtering or conditioning commands for the reconstruction may include segmentation, smoothing, vertex interpolation, and/or repeating-feature surface corrections.

The mobile device 102 may be used to capture sample data 314 pertaining to the part 106. The sample data 314 may refer generally to data captured by the mobile device 102 reflecting a current state of the part 106 and data describing various aspects of the capture process. The sample data 314 may include visual data 316 captured by the camera 116 of the mobile device 102 and may include images and/or video of the part 106. The sample data 314 may be captured based, at least in part, on the measurement data 304, which may have been received from the central server 108. For example, the visual data 316 may be captured according to the screen overlay directives of the measurement instructions 310 directing the operator to position the mobile device 102 in a manner to align a screen overlay indicator, such as a line, with a feature, such as a top edge, of the part 106 depicted in the display 114 of the mobile device 102. As another example, the visual data 316 may be captured according to the sample processing directives of the measurement instructions 310 in which the mobile device 102 seeks additional image or video data until the mobile device 102 recognizes a minimum quantity and/or quality of features of the part 106 in the captured image or video data.

The sample data 314 may further include metadata pertaining to the capture of the sample data 314. For example, the sample data 314 may include IMU data 318 from the IMU of the mobile device 102. The IMU data may include data representing the accelerations and/or rotations of the mobile device 102 during the process of capturing the sample data 314. The IMU data may indicate that the operator was not holding the mobile device 102 steady while capturing the visual data 316, for example. The sample data 314 may additionally include GPS data 320 from the GPS receiver of the mobile device 102. The GPS data 320 may include one or more set of geographical coordinates and may reflect movement of the mobile device 102. Other metadata may include information about the camera 116, such as accuracy, precision, and/or resolution characteristics of the camera 116, IMU, and/or GPS of the mobile device 102.

A part model 322 of the part 106 may be generated by the mobile device 102 based, at least, on the sample data 314 and/or the measurement instructions 310, such as the processing commands 312. The part model 322 may include a digital reconstruction of the part 106, such as a two-dimensional reconstruction or a dense three-dimensional reconstruction. The part model 322 may be generated by applying the processing commands 312 to the visual data 316. For example, the mobile device 102 may employ a feature isolation algorithm, such as a two-dimensional pyramid of kernel, histogram of gradients, or a convolutional neural network algorithm. The generation of the part model 322 may include a correlation of three-dimensional points in the part model 322 with specific pixels in the images or video of the visual data 316. Metadata pertaining to the part model 322 may additionally be determined, such as data indicative of image capture quality, mesh coverage, mesh resolution, blur, rotational error, transpositional error, occlusion density, mesh fidelity, accuracy of the lens correction, distance from the vertices on a mesh face, and/or the presence of shadows.

The mobile device 102 may determine wear assessment data 324 based, at least, on the part model 322 and/or the part description 306. The wear assessment data 324 may include a wear metric 326 reflecting the degree of wear of the part 106 or feature thereof. The wear metric 326 may be in a variety of forms, such as a percentage (e.g., the part 106 is 50% worn or the part 106 has 75% of its useful life remaining), an absolute value (e.g., a surface of the part 106 has worn down by 2 millimeters), or other indicator of degree of wear (e.g., "good," "fair," or "bad").

The determination of the wear metric 326 may include a comparison of some aspect of the part model 322, such as a dimension, a degree of curvature, or a relative position of two or more features, with a corresponding aspect of the part 106 in an unworn state, such as may be included in the part description 306 transmitted to the mobile device 102. The determination of the wear metric 326 may further be based on the data to interpret wear of the part description 306, which may include a correlation of measured values with degrees of wear. As an illustration, the thickness of a surface of the part 106 may be represented in the part model 322 as having a thickness of 8 millimeters. From the part description 306, the thickness of the surface of the part 106 in an unworn state is 10 millimeters, indicating that the surface has worn 2 millimeters. Based on the data to interpret wear, the wear metric 326 may comprise an indication that the surface is 20% worn or that the degree of wear is "fair." Alternatively or additionally, the wear metric 326 may simply indicate that the surface is 2 millimeters worn.

The wear assessment data 324 may additionally include a confidence metric 328 that reflects a degree of confidence that the wear metric 326 is accurate. The confidence metric 328 may be in the form of a percentage (e.g., 80% confidence) or other indicator (e.g., "high," "fair," or "low"). The confidence metric 328 may be determined based on the metadata of the sample data 314, such as the IMU data 318, the GPS data 320, or other metadata pertaining to the capture of the sample data 314, and/or the metadata of the part model 322, such as the mesh coverage or resolution of triangulations of the reconstruction of the part 106 in the part model 322. As an illustration, if the IMU data 318 indicates that the operator held the mobile device 102 steady during capture and that the metadata of the part model 322 indicates that the three-dimensional reconstruction of the part 106 is high resolution and has no unconstructed regions, the confidence metric 328 may indicate a high degree (e.g., 95% or "high") of confidence that the wear metric 326 is accurate.

In some instances, the mobile device 102 may be unable to capture sufficient visual data 316, determine the part model 322, and/or determine the wear metric 326 or the confidence metric 328 may be below a pre-determined threshold. In such instances, root cause data 330 may be determined that reflects one or more reasons for the inability to determine the wear metric 326 and/or with a satisfactory degree of confidence. For example, the root cause data 330 may indicate that the captured visual data 316 contains one or more shadows that prevent the edges of the part 106 to be accurately identified. Other examples of root cause data 330 may include indications of an insufficient coverage area of the visual data 316 or movements of the mobile device 102 during the capture process that rendered the visual data 316 blurry.

In order to rectify the failure identified in the root cause data 330, the mobile device 102 may present the operator with post processing facilities which enable the operator to provide user input 332. The post processing facilities may provide an interface depicting the part model 322 and/or the visual data 316. The operator may provide the user input 332 via the interface to alter and/or augment the part model 322 and/or the visual data 316, such as adding, altering, or removing lines, curves, and/or points in the part model 322 and/or the visual data 316. For example, the post processing facilities may provide an interface depicting the part model 322 in which a series of shadows in the visual data 316 has caused a number of lines to be incorrectly included in the part model 322. The operator may provide user input 332 to remove the lines caused by the shadows. After the operator provides the user input 332 to update the visual data 316 and/or the part model 322, the part model 322 may be re-generated using the updated visual data 316 and/or the wear assessment data 324 may be re-determined using the updated or re-generated part model 322. In this manner in which the operator provides user input 332, the wear detection process may be considered to be semi-automatic.

The wear assessment data 324 may be transmitted from the mobile device 102 to the central server 108. The wear assessment data 324 may be used by the central server 108 for feedback and updating the measurement data 304 for future requests to perform wear measurement detection. As an example, if the confidence metric 328 and root cause data 330 indicate that the wear metric 326 has a low degree of confidence due to repeated failure of the operator to capture the correct features of the part 106, the measurement instructions 310 on the central server 108 may be revised to provide better instructions for the operator. In addition, the wear assessment data 324 may be used by the central server 108 for subsequent order fulfillment or solicitation for sale of a replacement part. For example, if the wear metric 326 indicates that the part 106 is highly worn and ready for replacement, the central server 108 may solicit the operator or owner of the equipment 104 for sale of a replacement part.

Aspects

The present disclosure includes at least the following aspects.

Aspect 1: A method comprising: receiving first data associated with a part and indicative of a directive to provide an instruction for a camera to be situated in a specified position; responsive to a determination that the camera is situated in the specified position, receiving, by the camera, visual data associated with the part; receiving second data indicative of a directive for the mobile device to process the visual data; and determining a wear metric associated with the part, the wear metric based, at least, on the processed visual data.

Aspect 2: The method of aspect 1, wherein the instruction for the camera to be situated in a specified position comprises a textual instruction.

Aspect 3: The method of aspect 1, wherein the instruction for the camera to be situated in a specified position comprises a visual indicator to be presented in conjunction with a view of the part.

Aspect 4: The method of aspect 1, wherein the instruction for the camera to be situated in a specified position comprises an auditory signal.

Aspect 5: The method of aspect 1, further comprising: determining that one or more features of the part are recognized in the visual data, wherein the processing the visual data is responsive to the determining that the one or more features of the part are recognized in the visual data.

Aspect 6: The method of aspect 1, further comprising: determining a confidence metric associated with the wear metric.

Aspect 7: The method of aspect 1, further comprising: receiving a user input, the user input modifying the visual data; and processing the modified visual data to determine a second wear metric.

Aspect 8: A method comprising: receiving first data associated with a part and indicative of a directive to provide an instruction for a camera to be situated in a specified position; receiving second data comprising one or more dimensions of the part in an unworn state; responsive to a determination that the camera is situated in the specified position, receiving, by the camera, visual data associated with the part; generating a digital model of the part based, at least, on the visual data; and determining a wear metric based, at least, on the digital model of the part and the second data.

Aspect 9: The method of aspect 8, wherein the digital model comprises a three-dimensional reconstruction of the part.

Aspect 10: The method of aspect 8, further comprising: receiving third data indicative of a directive to process the digital model of the part; and determining the wear metric based, at least, on the digital model of the part, the second data, and the third data.

Aspect 11: The method of aspect 8, further comprising: receiving a user input, the user input modifying the digital model of the part; and processing the modified digital model of the part to determine a second wear metric.

Aspect 12: The method of aspect 11, wherein the user input comprises a modification of at least one of a line, curve, or point in the digital model of the part.

Aspect 13: The method of aspect 8, further comprising: determining a confidence metric associated with the wear metric.

Aspect 14: The method of aspect 13, wherein the confidence metric is based, at least, on data from an inertial measurement unit (IMU).

Aspect 15: A device comprising: a processor and a memory communicatively coupled with the processor, the memory having stored thereon executable instructions that when executed by the processor cause the processor to effectuate operations comprising: receiving first data associated with a part and indicative of a directive to provide an instruction for a camera to be situated in a specified position; responsive to a determination that the camera is situated in the specified position, receiving, by the camera, visual data associated with the part; receiving second data indicative of a directive to process the visual data; and processing, based at least on the second data, the visual data to determine a wear metric associated with the part.

Aspect 16: The device of aspect 15, wherein the operations further comprise: determining that one or more features of the part are recognized in the visual data, wherein the processing the visual data is responsive to the determining that the one or more features of the part are recognized in the visual data.

Aspect 17: The device of aspect 15, wherein the operations further comprise: determining a confidence metric associated with the wear metric.

Aspect 18: The device of aspect 17, wherein the determining the confidence metric is based, at least, on data from an inertial measurement unit (IMU).

Aspect 19: The device of aspect 15, wherein the operations further comprise: receiving user input, the user input modifying the visual data; and processing the modified visual data to determine a second wear metric.

Aspect 20: The device of aspect 15, wherein the operations further comprise: transmitting the wear metric to a central server.

INDUSTRIAL APPLICABILITY

The industrial applicability of the system and method of command-driven automatic and semi-automatic mobile wear detection described herein will be readily appreciated from the foregoing discussion.

Figure 4:
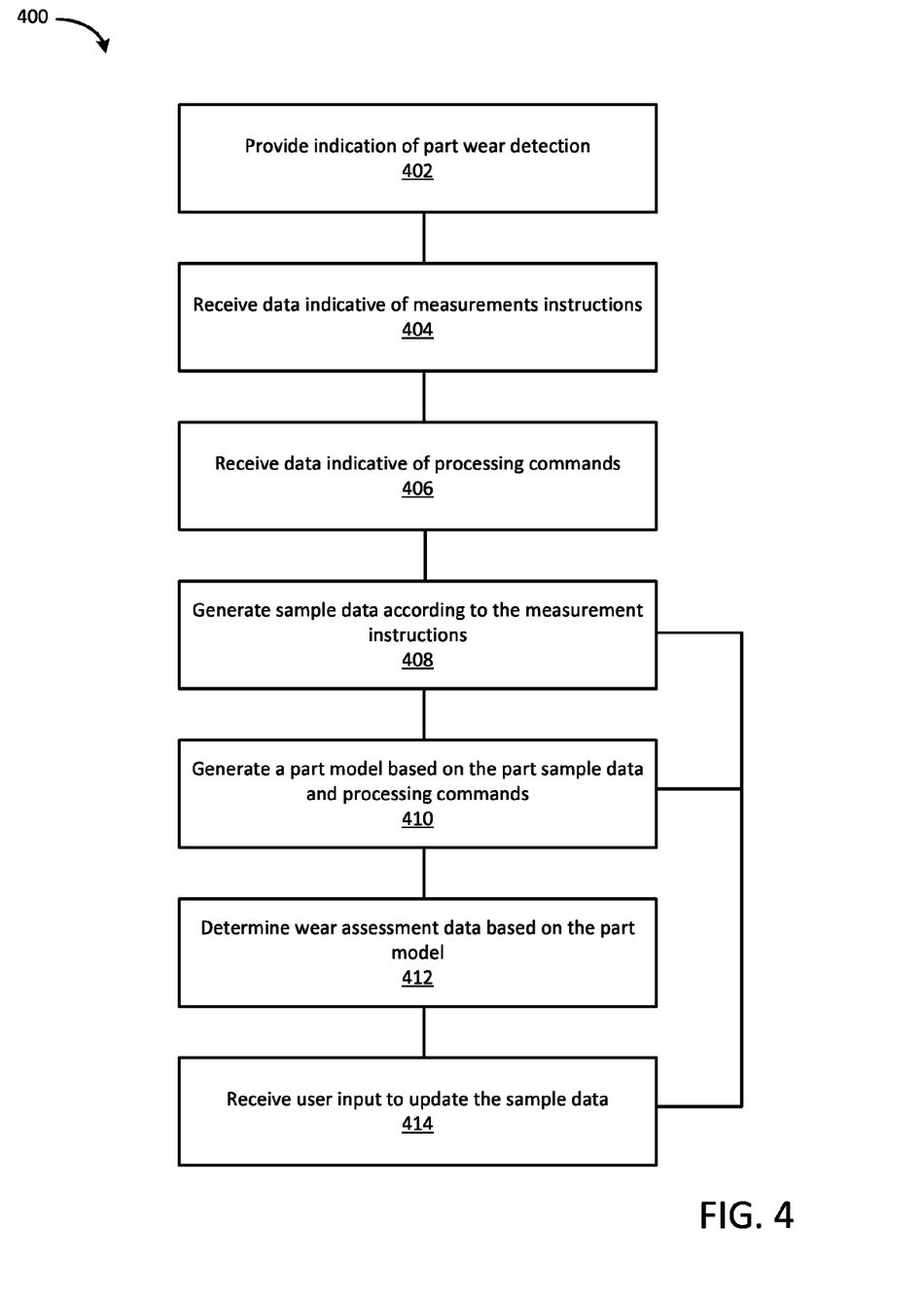
FIG. 4 illustrates a block diagram of an example method in accordance with aspects of the disclosure.

FIG. 4 illustrates an example process flow chart for a method 400 of mobile wear detection. For illustration purposes, the method 400 is discussed with reference to FIGS. 1 and 3. At step 402, an indication, such as the request 302, may be provided, such as by the mobile device 102 to the central server 108, that an operator wishes to perform a part wear detection with regard to the part 106.

At step 404, data indicative of a measurement instruction, such as the measurement instructions 310, may be received. The measurement instructions 310 may be received by the mobile device 102. The measurement instructions 310 may be transmitted by the central server 108 in response to the central server 108 receiving the request 302 from the mobile device 102. As discussed in detail above, the measurement instructions 310 may include one or more written directives, auditory signal directives, screen overlay directives, and/or sample processing directives. The measurement instructions 310 may be used by the mobile device 102 to provide instructions or feedback to the operator to guide the operator in positioning the mobile device 102 to capture a useful image or video of the part 106, such as the visual data 316.

Figure 5:
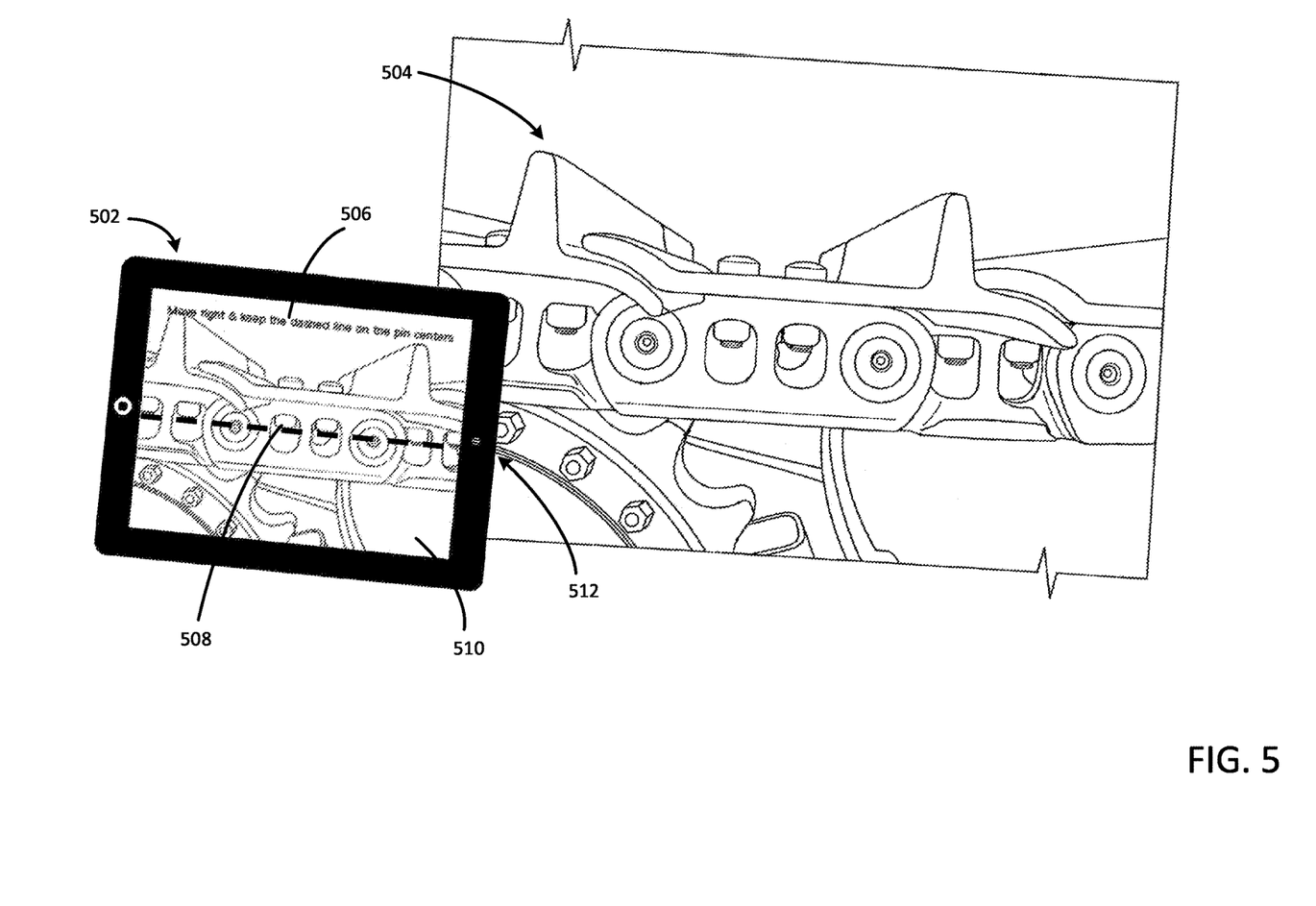
FIG. 5 illustrates a view of a part and interface on a mobile device in accordance with aspects of the disclosure.

As an example, FIG. 5 depicts a part 504 that is viewed by a camera 512 of a mobile device 502 and displayed on a display 510 of the mobile device 502. A textual instruction 506 may be displayed on the display 510 to guide the operator in positioning the mobile device 502 to capture image or video of the part 504. The textual instruction 506 may be determined by the mobile device 502 according to a written directive, such as the written directives of the measurement instructions 310. A visual overlay 508 comprising a dashed line may additionally be depicted on the display 510. According to the textual instruction 506, the operator may position the mobile device 502 so that the pins of the part 504 align with the dashed line. The visual overlay 508 may be determined by the mobile device 502 according to a screen overlay directive, such as the screen overlay directives of the measurement instructions 310.

Returning to FIG. 4, at step 406, data indicative of a processing instruction, such as the processing commands 312, may be received, such as by the mobile device 102 from the central server 108. The processing commands 312 may be transmitted by the central server 108 in response to the central server 108 receiving the request 302 from the mobile device 102. The processing commands 312 may include one or more commands that are usable by the mobile device 102 to analyze the captured visual data 316 and/or the part model 322, as described in further detail above. It will be appreciated that in some aspects, the measurement instructions 310 and/or the processing commands 312 may be received by the mobile device 102 sometime prior to the operator using the mobile device 102 to determine the wear metric 326 of the particular part 106. In other words, the receipt of the measurement instructions 310 and/or the processing commands 312 is not necessarily contemporaneous with the other steps of the process of determining the wear metric 326. For example, the mobile device 102 may receive the measurement instructions 310 and/or the processing commands 312 while connected to the network 110, disconnect from the network 110, and several hours later may be used while offline to detect the wear of the part 106.

At step 408, sample data, such as the sample data 314, may be generated according to the measurement instructions 310. The sample data may be generated by the mobile device 102. The sample data may include visual data, such as the visual data 316, captured by the camera 116 of the mobile device 102. For example, the measurement instructions 310 may direct the user to position the mobile device 102 in a manner so that the camera of the mobile device 102 may capture one or more clear images of the relevant portion of the part 106 to perform a wear detection. Then sample data 314 may further include metadata relating to the capture of the visual data 316.

At step 410, a part model, such as the part model 322, may be generated, such as by the mobile device 102, according to the sample data 314 and processing commands 312. The part model 322 may be generated by applying the processing commands 312 to the visual data 316 of the sample data 314, such as by correlating three-dimensional points of the part model 322 with pixels of the images or video of the visual data 316. The part model 322 may include a dense three-dimensional reconstruction of the part 106. The part model 322 may further include metadata reflecting various quality metrics pertaining to the part model 322 and/or the visual data 316.

At step 412, wear assessment data, such as the wear assessment data 324, may be determined, based at least on the part model 322. The wear assessment data 324 may be determined by the mobile device 102. The wear assessment data 324 may include a wear metric, such as the wear metric 326, that reflects the degree of wear of the part 106. The wear metric 326 may be determined, for example, by a comparison of one or more aspects of the part model 322 with a description of the part 106, such as the part description 306, in an unworn state.

The wear assessment data 324 may further include a metric, such as the confidence metric 328, reflecting a degree of confidence that the wear metric 326 is accurate. If the wear metric 326 is unable to be determined or if the confidence metric 328 reflects an unsatisfactory degree of confidence, root cause data, such as the root cause data 330, may be determined that reflects a cause for the failure or unsatisfactorily low confidence metric 328.

At step 414, user input, such as the user input 332, may be received, such as by a user interface in a post processing facility on the mobile device 102. The user input 332 may be received to correct a failure or other problem identified in the root cause data 330. The user input 332 may include an input by the operator to add, alter, or remove an aspect, such as a line, curve or point, of the visual data 316 and/or the part model 322. The updated visual data 316 and/or part model 322 may be used to generate an updated part model and/or determine updated wear assessment data.

Whether such functionality is implemented as hardware or software depends upon the design constraints imposed on the overall system. Skilled persons may implement the described functionality in varying ways for each particular application, but such implementation decisions should not be interpreted as causing a departure from the scope of the disclosure. In addition, the grouping of functions within a module, block, or step is for ease of description. Specific functions or steps may be moved from one module or block without departing from the disclosure.

The various illustrative logical blocks and modules described in connection with the aspects disclosed herein may be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the aspects disclosed herein may be embodied directly in hardware, in a software module executed by a processor (e.g., of a computer), or in a combination of the two. A software module may reside, for example, in RAM memory, flash memory, ROM memory, EPROM memory, EEPROM memory, registers, hard disk, a removable disk, a CD-ROM, or any other form of storage medium. An exemplary storage medium may be coupled to the processor such that the processor may read information from, and write information to, the storage medium. In the alternative, the storage medium may be integral to the processor. The processor and the storage medium may reside in an ASIC.

In at least some aspects, a processing system (e.g., the mobile device 102 or the central server 108) that implements a portion or all of one or more of the technologies described herein may include a general-purpose computer system that includes or is configured to access one or more computer-accessible media.

Figure 6:
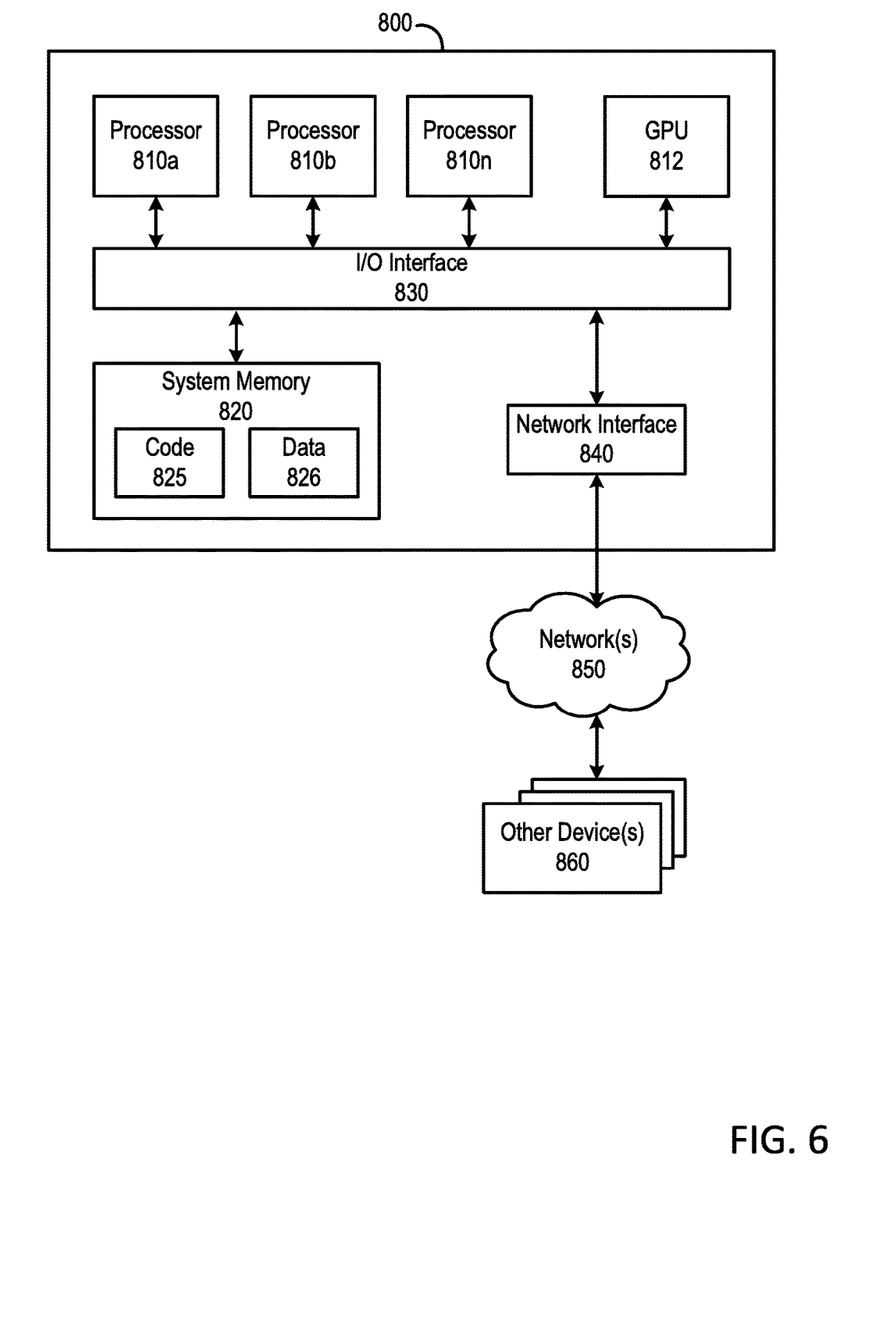
FIG. 6 illustrates a block diagram of a computer system configured to implement the method of FIG. 4.

FIG. 6 depicts a general-purpose computer system that includes or is configured to access one or more computer-accessible media. In the illustrated aspect, a computing device 800 may include one or more processors 810a, 810b, and/or 810n (which may be referred herein singularly as the processor 810 or in the plural as the processors 810) coupled to a system memory 820 via an input/output (I/O) interface 830. The computing device 800 may further include a network interface 840 coupled to an I/O interface 830.

In various aspects, the computing device 800 may be a uniprocessor system including one processor 810 or a multiprocessor system including several processors 810 (e.g., two, four, eight, or another suitable number). The processors 810 may be any suitable processors capable of executing instructions. For example, in various aspects, the processor(s) 810 may be general-purpose or embedded processors implementing any of a variety of instruction set architectures (ISAs), such as the x86, PowerPC, SPARC, or MIPS ISAs, or any other suitable ISA. In multiprocessor systems, each of the processors 810 may commonly, but not necessarily, implement the same ISA.

In some aspects, a graphics processing unit ("GPU") 812 may participate in providing graphics rendering and/or physics processing capabilities. A GPU may, for example, include a highly parallelized processor architecture specialized for graphical computations. In some aspects, the processors 810 and the GPU 812 may be implemented as one or more of the same type of device.

The system memory 820 may be configured to store instructions and data accessible by the processor(s) 810. In various aspects, the system memory 820 may be implemented using any suitable memory technology, such as static random access memory ("SRAM"), synchronous dynamic RAM ("SDRAM"), nonvolatile/Flash®-type memory, or any other type of memory. In the illustrated aspect, program instructions and data implementing one or more desired functions, such as those methods, techniques and data described above, are shown stored within the system memory 820 as code 825 and data 826.

In one aspect, the I/O interface 830 may be configured to coordinate I/O traffic between the processor(s) 810, the system memory 820 and any peripherals in the device, including a network interface 840 or other peripheral interfaces. In some aspects, the I/O interface 830 may perform any necessary protocol, timing or other data transformations to convert data signals from one component (e.g., the system memory 820) into a format suitable for use by another component (e.g., the processor 810). In some aspects, the I/O interface 830 may include support for devices attached through various types of peripheral buses, such as a variant of the Peripheral Component Interconnect (PCI) bus standard or the Universal Serial Bus (USB) standard, for example. In some aspects, the function of the I/O interface 830 may be split into two or more separate components, such as a north bridge and a south bridge, for example. Also, in some aspects some or all of the functionality of the I/O interface 830, such as an interface to the system memory 820, may be incorporated directly into the processor 810.

The network interface 840 may be configured to allow data to be exchanged between the computing device 800 and other device or devices 860 attached to a network or networks 850, such as other computer systems or devices, for example. In various aspects, the network interface 840 may support communication via any suitable wired or wireless general data networks, such as types of Ethernet networks, for example. Additionally, the network interface 840 may support communication via telecommunications/telephony networks, such as analog voice networks or digital fiber communications networks, via storage area networks, such as Fibre Channel SANs (storage area networks), or via any other suitable type of network and/or protocol.

In some aspects, the system memory 820 may be one aspect of a computer-accessible medium configured to store program instructions and data as described above for implementing aspects of the corresponding methods and apparatus. However, in other aspects, program instructions and/or data may be received, sent, or stored upon different types of computer-accessible media. Generally speaking, a computer-accessible medium may include non-transitory storage media or memory media, such as magnetic or optical media, e.g., disk or DVD/CD coupled to computing device the 800 via the I/O interface 830. A non-transitory computer-accessible storage medium may also include any volatile or non-volatile media, such as RAM (e.g., SDRAM, DDR SDRAM, RDRAM, SRAM, etc.), ROM, etc., that may be included in some aspects of the computing device 800 as the system memory 820 or another type of memory. Further, a computer-accessible medium may include transmission media or signals, such as electrical, electromagnetic or digital signals, conveyed via a communication medium, such as a network and/or a wireless link, such as those that may be implemented via the network interface 840. Portions or all of multiple computing devices, such as those illustrated in FIG. 6, may be used to implement the described functionality in various aspects; for example, software components running on a variety of different devices and servers may collaborate to provide the functionality. In some aspects, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

It should also be appreciated that the systems in the figures are merely illustrative and that other implementations might be used. Additionally, it should be appreciated that the functionality disclosed herein might be implemented in software, hardware, or a combination of software and hardware. Other implementations should be apparent to those skilled in the art. It should also be appreciated that a server, gateway, or other computing node may include any combination of hardware or software that may interact and perform the described types of functionality, including without limitation desktop or other computers, database servers, network storage devices and other network devices, PDAs, tablets, cellphones, wireless phones, pagers, electronic organizers, Internet appliances, and various other consumer products that include appropriate communication capabilities. In addition, the functionality provided by the illustrated modules may in some aspects be combined in fewer modules or distributed in additional modules. Similarly, in some aspects the functionality of some of the illustrated modules may not be provided and/or other additional functionality may be available.

Each of the operations, processes, methods, and algorithms described in the preceding sections may be embodied in, and fully or partially automated by, code modules executed by at least one computer or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto may be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example aspects. The example systems and components described herein may be configured differently than described. For example, elements may be added to, removed from, or rearranged compared to the disclosed example aspects.

It will also be appreciated that various items are illustrated as being stored in memory or on storage while being used, and that these items or portions of thereof may be transferred between memory and other storage devices for purposes of memory management and data integrity. Alternatively, in other aspects some or all of the software modules and/or systems may execute in memory on another device and communicate with the illustrated computing systems via inter-computer communication. Furthermore, in some aspects, some or all of the systems and/or modules may be implemented or provided in other ways, such as at least partially in firmware and/or hardware, including, but not limited to, at least one application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other aspects. Accordingly, the disclosure may be practiced with other computer system configurations.

Conditional language used herein, such as, among others, "may," "could," "might," "may," "e.g.," and the like, unless specifically stated otherwise, or otherwise understood within the context as used, is generally intended to convey that certain aspects include, while other aspects do not include, certain features, elements, and/or steps. Thus, such conditional language is not generally intended to imply that features, elements, and/or steps are in any way required for at least one aspects or that at least one aspects necessarily include logic for deciding, with or without author input or prompting, whether these features, elements, and/or steps are included or are to be performed in any particular aspect. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example aspects have been described, these aspects have been presented by way of example only, and are not intended to limit the scope of aspects disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of aspects disclosed herein. The accompanying claims and their equivalents are intended to cover such forms or modifications as would fall within the scope and spirit of certain aspects disclosed herein.

The preceding detailed description is merely exemplary in nature and is not intended to limit the disclosure or the application and uses of the disclosure. The described aspects are not limited to use in conjunction with a particular type of machine. Hence, although the present disclosure, for convenience of explanation, depicts and describes particular machine, it will be appreciated that the assembly and electronic system in accordance with this disclosure may be implemented in various other configurations and may be used in other types of machines. Furthermore, there is no intention to be bound by any theory presented in the preceding background or detailed description. It is also understood that the illustrations may include exaggerated dimensions to better illustrate the referenced items shown, and are not consider limiting unless expressly stated as such.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

The disclosure may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, a cellular telephone network, a Personal Communications Service (PCS), using known protocols such as the Global System for Mobile Communications (GSM), CDMA (Code-Division Multiple Access), Long Term Evolution (LTE), W-CDMA (Wideband Code-Division Multiple Access), Wireless Fidelity (Wi-Fi), Bluetooth, and/or the like, and/or a combination of two or more thereof.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context.

We claim:

1. A method comprising:
    receiving, by a mobile device, first data associated with a part and indicative of a directive for the mobile device to provide an instruction for the mobile device to be situated in a specified position;
    responsive to a determination, by the mobile device, that the mobile device is situated in the specified position, receiving, by a camera of the mobile device, visual data associated with the part;
    receiving, by the mobile device, second data indicative of a directive for the mobile device to process the visual data;
    determining, by the mobile device, a wear metric associated with the part, the wear metric based, at least, on the processed visual data;
    identifying a user type of a user of the mobile device;
    displaying the wear metric on the mobile device in a format selected based on the user type;
    determining from inertial measurement unit (IMU) data of the mobile device, an amount of movement of the mobile device that the mobile device experienced during receiving the visual data associated with the part via the camera; and
    outputting a confidence metric with the wear metric based on the amount of movement, the confidence metric indicative of confidence that the wear metric is accurate based on the amount of movement of the mobile device.

2. The method of claim 1, wherein the instruction for the mobile device to be situated in a specified position comprises a textual instruction to be displayed on a display of the mobile device.

3. The method of claim 1, wherein the instruction for the mobile device to be situated in a specified position comprises a visual indicator displayed on a display of the mobile device and overlaid upon a view of the part on the display.

4. The method of claim 1, wherein the instruction for the mobile device to be situated in a specified position comprises an auditory signal.

5. The method of claim 1, further comprising:
    determining that one or more features of the part are recognized in the visual data, wherein the processing of the visual data is responsive to the determining that the one or more features of the part are recognized in the visual data.

6. The method of claim 1, further comprising:
    receiving, by the mobile device, an input from a user of the mobile device, the input modifying the visual data; and
    processing the modified visual data to determine a second wear metric.

7. A method comprising:
    receiving, by a mobile device, first data associated with a part of equipment and indicative of a directive for the mobile device to communicate an instruction for the mobile device to be situated in a specified position;
    receiving, by the mobile device, second data comprising one or more dimensions of the part in an unworn state;
    responsive to a determination, by the mobile device, that the mobile device is situated in the specified position, receiving, by a camera of the mobile device, visual data associated with the part;
    generating, by the mobile device, a digital model of the part based, at least, on the visual data;
    determining, by the mobile device, a wear metric based, at least, on the digital model of the part and the second data;
    identifying a user type of a user of the mobile device;
    displaying the wear metric on the mobile device in a format selected based on the user type;
    determining from inertial measurement unit (IMU) data of the mobile device, an amount of movement of the mobile device that the mobile device experienced during receiving the visual data associated with the part via the camera; and
    outputting a confidence metric with the wear metric based on the amount of movement, the confidence metric indicative of confidence that the wear metric is accurate based on the amount of movement of the mobile device.

8. The method of claim 7, wherein the digital model comprises a three-dimensional reconstruction of the part.

9. The method of claim 7, further comprising:
    receiving, by the mobile device, third data indicative of a directive for the mobile device to process the digital model of the part; and
    determining, by the mobile device, the wear metric based, at least, on the digital model of the part, the second data, and the third data.

10. The method of claim 7, further comprising:
    receiving, by the mobile device, an input from a user of the mobile device, the input modifying the digital model of the part; and
    processing the modified digital model of the part to determine a second wear metric.

11. The method of claim 10, wherein the input from the user of the mobile device comprises a modification of at least one of a line, curve, or point in the digital model of the part.

12. A mobile device comprising:
   a processor;
   a camera; and
   a memory communicatively coupled with the processor, the memory having stored thereon executable instructions that when executed by the processor cause the processor to effectuate operations comprising:
   receiving first data associated with a part and indicative of a directive for the mobile device to provide an instruction for the mobile device to be situated in a specified position;
   responsive to a determination that the mobile device is situated in the specified position, receiving, by the camera, visual data associated with the part;
   receiving second data indicative of a directive for the mobile device to process the visual data;
   processing, based at least on the second data, the visual data to determine a wear metric associated with the part;
   identify a user type of a user of the mobile device;
   display the wear metric on the mobile device in a format selected based on the user type;
   determining from inertial measurement unit (IMU) data of the mobile device, an amount of movement of the mobile device that the mobile device experienced during receiving the visual data associated with the part via the camera; and
   outputting a confidence metric with the wear metric based on the amount of movement, the confidence metric indicative of confidence that the wear metric is accurate based on the amount of movement of the mobile device.

13. The mobile device of claim 12, wherein the operations further comprise:
   determining that one or more features of the part are recognized in the visual data, wherein the processing of the visual data is responsive to the determining that the one or more features of the part are recognized in the visual data.

14. The mobile device of claim 12, wherein the operations further comprise:
   receiving an input from a user of the mobile device, the input modifying the visual data; and
   processing the modified visual data to determine a second wear metric.

15. The mobile device of claim 12, wherein the operations further comprise:
   transmitting the wear metric to a central server.

* * * * *